Dec. 16, 1930.  A. ROESCH ET AL  1,785,531
WEEDING TOOL
Filed March 5, 1929
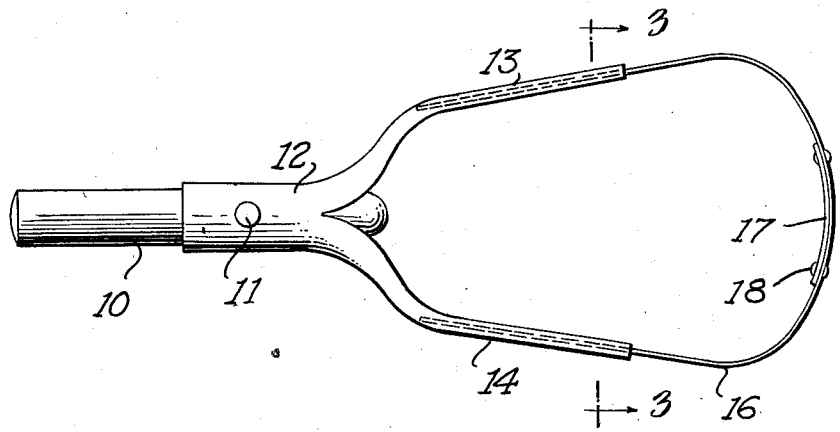
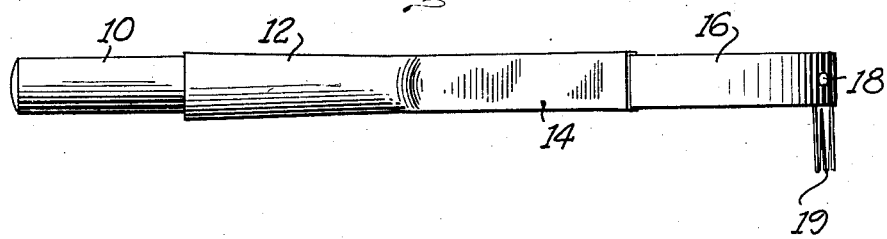
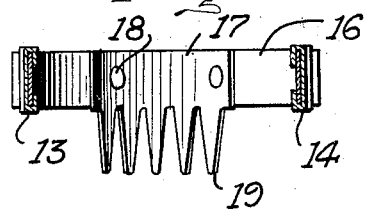
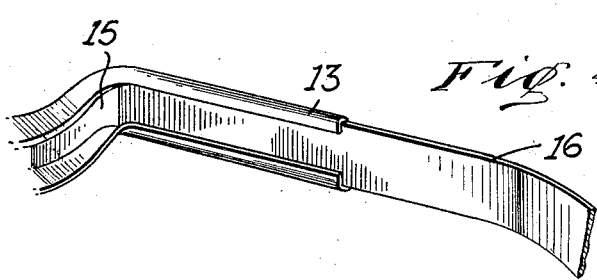
Inventor
Alfred Roesch
John Roettinger
By their Attorney Patented Dec. 16, 1930

1,785,531

UNITED STATES PATENT OFFICE

ALFRED ROESCH AND JOHN ROETTINGER, OF RAHWAY, NEW JERSEY

WEEDING TOOL

Application filed March 5, 1929. Serial No. 344,197.

Our invention relates to improvements in weeding tools and it is the principal object of the invention to provide a tool of this type with an end comb by means of which the weeds can be removed from the soil together with their roots.

This uprooting comb may have 5 to 6, 7 to 8, or even more teeth adapted to be pressed into the ground and to positively remove the weeds together with their roots.

Another object of our invention is the provision of a tool of this character which is simple in its construction and therefore comparatively inexpensive to manufacture, yet durable and efficient in its operation.

A further object of our invention is the provision of a weeding tool allowing a ready removal and exchange of the tool from its handle.
These and other objects and advantages of our invention will become more fully apparent as the description thereof proceeds and will then be more specifically defined in the appended claims.
In the accompanying drawing, forming a material part of this disclosure:—

Fig. 1 is a top plan view of the weeding tool constructed according to our invention.

Fig. 2 is a side edge view thereof.
Fig. 3 is an end view of the tool, partly in section on line 3—3 of Figure 1.

Fig. 4 is a fragmentary inside view of a tool holder and part of the weeding tool proper, connected with said holder.
As illustrated, the novel and improved weeding tool comprises a handle 10 of any ordinary well known construction to which is secured by means of a rivet 11 or the like the socket of a forked tool holder 12 having its arms 13, 14 channeled as at 15 and adapted to receive the inner ends of an elastic loop member 16, which ends are adapted to be bent towards each other and to expand within the channels so as to be firmly held therein by friction, while they allow obviously a ready removal therefrom and exchange.

To the inner curve of the apex of the member 16 a comb 17 is secured by means of bolts or rivets 18 or the like, said comb having a plurality of downwardly directed teeth 19 of any desired and suitable number.

The operation of our weeding tool will be entirely clear from the above description and it will be clear that by pressing the teeth of the comb into the soil behind the weeds and pulling the handle the weeds will effectively be removed together with their roots.

It will be understood that we have disclosed the preferred form of our device only as one example of the many ways to practically construct the same, and that we may make such changes in the construction of the minor details of our tool as come within the scope of the appended claims without departure from our invention.

Having thus described our invention, what we claim as new, and desire to protect by Letters Patent is:

1. A weeding tool comprising a handle, a forked holder having a socket adapted to be riveted to the end of said handle, a pair of arms U-shaped in cross-section to form channels integral with said socket, and a loop member having elastic arms or ends adapted when bent towards each other to engage the said channels and to be frictionally held therein upon their release for expansion, and a means attached at the apex of said loop for uprooting weeds by pulling on said handle.

2. A weeding tool comprising a handle, a forked tool holder having a socket formed therewith for engagement by the end of said handle, means for securing said handle in said socket, channeled arms on said holder, an elastic loop member having its ends bent towards each other and introduced into the channels of said arms, to be firmly held therein by friction due to the tendency of said arms to spread, a comb riveted to the inner curve of the apex of said loop, and a plurality of downwardly directed teeth on said comb.

In witness whereof we have signed our names to this specification.

ALFRED ROESCH.
JOHN ROETTINGER.